(12) United States Patent
Ishida et al.

(10) Patent No.: US 8,951,153 B2
(45) Date of Patent: Feb. 10, 2015

(54) POWER TRANSMISSION MECHANISM

(75) Inventors: Tomokazu Ishida, Hyogo (JP); Hayato Shimamura, Hyogo (JP)

(73) Assignee: Mitsuboshi Belting Ltd., Hyogo (JP)

(*) Notice: Subject to any disclaimer, the term of this patent is extended or adjusted under 35 U.S.C. 154(b) by 443 days.

(21) Appl. No.: 13/379,249

(22) PCT Filed: Jun. 18, 2010

(86) PCT No.: PCT/JP2010/060390
§ 371 (c)(1),
(2), (4) Date: Dec. 19, 2011

(87) PCT Pub. No.: WO2010/147220
PCT Pub. Date: Dec. 23, 2010

(65) Prior Publication Data
US 2012/0100945 A1   Apr. 26, 2012

(30) Foreign Application Priority Data
Jun. 19, 2009   (JP) ................................. 2009-146082

(51) Int. Cl.
*F16D 3/00* (2006.01)
*F16H 55/14* (2006.01)
(Continued)

(52) U.S. Cl.
CPC ............ *F16D 43/18* (2013.01); *F16F 15/1216* (2013.01); *F16H 55/36* (2013.01); *F16H 2055/366* (2013.01)
USPC .............................................. 474/94; 474/74

(58) Field of Classification Search
CPC ........................... F16H 55/36; F16H 2055/366
USPC .................................... 474/94, 74; 192/104 C
See application file for complete search history.

(56) References Cited
U.S. PATENT DOCUMENTS 335,460 A * 2/1886 Koelkebeck ............... 192/104 C
1,009,219 A * 11/1911 Boyle ........................... 192/41 R
(Continued)

FOREIGN PATENT DOCUMENTS

CN       1668859 A    9/2005
CN    101111692 A    1/2008
(Continued)

OTHER PUBLICATIONS

Extended European Search Report dated Dec. 21, 2012 issued by the European Patent Office in counterpart European Patent Application No. 10789593.0.
(Continued)

*Primary Examiner* — Henry Liu
(74) *Attorney, Agent, or Firm* — Sughrue Mion, PLLC

(57) ABSTRACT

The present power transmission mechanism comprises: a first rotation member mounted integrally rotatably on the rotation shaft of a drive apparatus; a second rotation member rotatable integrally with or relative to the first rotation member; an elastic member interposed between the first and second rotation members which, when the first and second rotation members rotate relative to each other, absorbs a rotation difference between them; and, a switching portion which includes a mass member mounted on one of the first and second rotation members and rotatable integrally therewith, and an energizing member for energizing the mass member in a direction where it can be contacted with the other of the first and second rotation members. In the switching portion, when the number of rotations of the rotation shaft is a given number of rotations or less, the mass member is contacted with the other rotation member due to the energizing force of the energizing member to generate a frictional force between their contacted surfaces, thereby preventing the relative rotation between the first and second rotation members. And, when the number of rotations of the rotation shaft exceeds a given number of rotations, due to a centrifugal force generated from the rotation of the rotation shaft, the mass member is shifted against the energizing force of the energizing member and is separated from the other rotation member, thereby allowing the relative rotation between the first and second rotation members through the elastic member.

11 Claims, 9 Drawing Sheets

(51) Int. Cl.
*F16H 55/36* (2006.01)
*F16H 9/00* (2006.01)
*F16H 59/00* (2006.01)
*F16H 61/00* (2006.01)
*F16H 63/00* (2006.01)
*F16D 43/18* (2006.01)
*F16F 15/121* (2006.01)

(56) References Cited

U.S. PATENT DOCUMENTS

| | | | |
|---|---|---|---|
| 1,017,126 A * | 2/1912 | Barenz | 192/104 C |
| 1,230,560 A * | 6/1917 | Camp | 494/8 |
| 1,256,228 A * | 2/1918 | Hensley | 322/30 |
| 1,689,913 A * | 10/1928 | Carrey | 192/105 BA |
| 1,745,738 A * | 2/1930 | Carter, Jr. | 192/56.53 |
| 1,927,509 A * | 9/1933 | Waterhouse | 192/103 B |
| 2,163,080 A * | 6/1939 | Benedek | 91/492 |
| 2,464,675 A * | 3/1949 | Dodge | 192/104 R |
| 2,607,327 A * | 8/1952 | Lee | 123/41.11 |
| 2,720,300 A | 10/1955 | Muhlbeyer | |
| 2,758,689 A * | 8/1956 | Spase | 192/104 C |
| 2,853,168 A * | 9/1958 | Spase | 192/104 C |
| 2,855,079 A * | 10/1958 | Spase | 464/41 |
| 2,860,519 A * | 11/1958 | Cavanaugh | 474/70 |
| 2,863,545 A * | 12/1958 | Spase | 192/104 C |
| 2,869,699 A * | 1/1959 | Bochan | 192/48.1 |
| 2,881,889 A * | 4/1959 | Verhoeff | 192/79 |
| 2,948,373 A * | 8/1960 | Schild | 192/56.1 |
| 3,145,817 A | 8/1964 | Randall | |
| 3,159,257 A * | 12/1964 | Bochan | 192/104 R |
| 3,208,571 A | 9/1965 | Bochory | |
| 3,324,984 A * | 6/1967 | Brame | 192/104 C |
| 3,461,994 A * | 8/1969 | Haag et al. | 192/105 BA |
| 3,666,065 A * | 5/1972 | Schmidt | 192/103 A |
| 3,769,858 A * | 11/1973 | Merrell et al. | 475/159 |
| 4,061,439 A * | 12/1977 | Pech | 415/18 |
| 4,298,110 A * | 11/1981 | Toma | 192/48.4 |
| 4,299,319 A * | 11/1981 | Bochan | 192/103 B |
| 4,494,637 A * | 1/1985 | Gotoda et al. | 192/48.4 |
| 4,673,073 A * | 6/1987 | Weatherby | 192/35 |
| 4,674,612 A * | 6/1987 | Ogura | 192/48.92 |
| 4,687,085 A * | 8/1987 | Shimizu et al. | 192/104 C |
| 5,086,657 A * | 2/1992 | Wang et al. | 74/7 C |
| 5,517,957 A * | 5/1996 | Wagner et al. | 123/192.1 |
| 5,879,254 A * | 3/1999 | Tanaka | 474/74 |
| 6,119,841 A * | 9/2000 | Orlamunder | 192/81 C |
| 7,143,881 B2 * | 12/2006 | Ichihara et al. | 192/45.009 |
| 7,347,309 B2 * | 3/2008 | Wiesneth et al. | 192/45.005 |
| 7,377,343 B2 * | 5/2008 | Adams et al. | 180/65.6 |
| 7,931,552 B2 * | 4/2011 | Pendergrass et al. | 474/74 |
| 7,980,372 B2 * | 7/2011 | Wiesneth et al. | 192/46 |
| 7,998,008 B2 * | 8/2011 | Kamdem et al. | 474/94 |
| 8,006,819 B2 * | 8/2011 | Dell et al. | 192/42 |
| 8,177,669 B2 * | 5/2012 | Ishida et al. | 474/94 |
| 8,215,468 B2 * | 7/2012 | Hartmann et al. | 192/46 |
| 8,302,753 B2 * | 11/2012 | Antchak et al. | 192/55.5 |
| 8,419,574 B2 * | 4/2013 | Serkh et al. | 474/94 |
| 8,602,928 B2 * | 12/2013 | Serkh et al. | 474/70 |
| 8,678,157 B2 * | 3/2014 | Ward et al. | 192/55.1 |
| 2007/0066426 A1 * | 3/2007 | Kamdem et al. | 474/94 |
| 2009/0105021 A1 * | 4/2009 | Amati et al. | 474/94 |
| 2011/0005889 A1 * | 1/2011 | Webb et al. | 192/104 C |
| 2011/0065537 A1 * | 3/2011 | Serkh et al. | 474/94 |
| 2012/0088616 A1 * | 4/2012 | Ali et al. | 474/94 |

FOREIGN PATENT DOCUMENTS

| | | |
|---|---|---|
| JP | 63-139335 A | 9/1988 |
| JP | 6-94078 A | 4/1994 |
| JP | 3268007 A | 1/2002 |
| JP | 2006-22884 A | 1/2006 |
| JP | 2007-270883 A | 10/2007 |

OTHER PUBLICATIONS

Office Action dated Apr. 3, 2014 issued by the State Intellectual Property Office of the People's Republic of China in counterpart Chinese Patent Application No. 201080027235.X.
International Search Report (PCT/ISA/210) issued on Sep. 21, 2010 in the International Patent Application No. PCT/JP2010/060390.
Written Opinion (PCT/ISA/237) issued on Sep. 21, 2010 in the International Patent Application No. PCT/JP2010/060390.

* cited by examiner $$\begin{cases} Tx = \dfrac{k\delta}{\sin\theta} & \cdots(1) \\ Ty = \dfrac{m\gamma\omega^2}{\cos\theta} & \cdots(2) \end{cases}$$

POWER TRANSMISSION MECHANISM

TECHNICAL FIELD

The present invention relates to a power transmission mechanism which includes two rotation members rotatable relative to each other and can be applied to, for example, the auxiliary machine drive system of an engine for a car.

BACKGROUND ART

In the above type power transmission mechanism, there is known a technology in which an elastic member is interposed between a pulley and a hub respectively serving as rotation members and the elastic member is used to absorb a rotation difference between the pulley and hub when they are rotated relative to each other (see the patent reference 1).

RELATE ART DOCUMENT

Patent Document

Patent Reference 1: Japanese Patent No. 3268007

SUMMARY OF THE INVENTION

Problems that the Invention is to Solve

However, at the start of the rotation of an engine, due to resonance, a large relative rotation difference is easy to occur between the pulley and hub. In the technology disclosed in the patent reference 1, the elastic member is fatigued with absorption of the large rotation difference and thus the durability of the elastic member is worsened.

It is an object of the invention to provide a power transmission mechanism which can reduce the fatigue of an elastic member in absorbing a rotation difference between first and second rotation members.

Means for Solving the Problem

In attaining the above object, according to a first aspect of the invention, there is provided a power transmission mechanism which comprises: a first rotation member mounted integrally rotatably on the rotation shaft of a drive apparatus; a second rotation member rotatable integrally with or relative to the first rotation member; an elastic member interposed between the first and second rotation members which, when the first and second rotation members are rotated relative to each other, absorbs a rotation difference between them; and, a switching portion which includes a mass member mounted on one of the first and second rotation members to be rotatable integrally therewith, and an energizing member for energizing the mass member in a direction where it can be contacted with the other of the first and second rotation members. In the switching portion, when the number of rotations of the rotation shaft is a given number of rotations or less, the mass member is contacted with the other rotation member due to the energizing force of the energizing member to generate a frictional force between their respective contacted surfaces, thereby preventing the relative rotation between the first and second rotation members. And, when the number of rotations of the rotation shaft exceeds a given number of rotations, due to a centrifugal force generated from the rotation of the rotation shaft, the mass member is shifted against the energizing force of the energizing member and is separated from the other rotation member, thereby permitting the relative rotation between the first and second rotation members through the elastic member.

According to the first aspect, when the number of rotations of the rotation shaft of the drive apparatus is a given number of rotations or less (for example, at the start of rotation of the rotation shaft), the switching portion prevents the relative rotation between the first and second rotation members (that is, permits their integral rotation), thereby preventing the occurrence of the rotation difference between these rotation members. Therefore, since a large stress is not applied to the elastic member, the fatigue of the elastic member can be reduced.

The switching portion may also include a friction member disposed on the surface of the mass member and having a first surface to be contacted with the other rotation member, while the first surface may have a larger coefficient of friction than the surface of the mass member. When the number of rotations of the rotation shaft is a given number of rotations or less, the friction member may be contacted with the other rotation member and, when the number of rotations of the rotation shaft exceeds a given number of rotations, the friction member may be shifted together with the mass member and may be thereby separated from the other rotation member. In this structure, the existence of the friction member can strengthen the connection between the first and second rotation members when the number of rotations of the rotation shaft is a given number of rotations or less, thereby being able to prevent their relative rotation (to permit their integral rotation) more positively. Thus, the durability of the elastic member can be enhanced further.

The friction member may be made of rubber or resin. In this case, the above effects (the relative rotation preventive effect and the enhanced durability effect of the elastic member provided by the former effect) can be provided using a friction member which can be produced at a relatively low cost and has a simple structure.

The first surface may include a curved surface corresponding to the curved surface of the other rotation member. In this case, since the contact areas of the mass member and the other rotation member are mutually corresponding curved surfaces, the connection between the first and second rotation members when the number of rotations of the rotation shaft is a given number of rotations or less can be strengthened. This can realize the prevention of their relative rotation (permission of their integral rotation) more positively. Thus, the durability of the elastic member can be enhanced still further.

Since the mass member is connected by the energizing member, it has an annulus-like shape along the outer periphery of the first rotation member, and the mass member is also mounted on the second rotation member such that it can be rotated integrally with the second rotation member and the diameter of the annulus to be formed by the mass member can be increased or decreased. And, the energizing member may apply to the mass member an energizing force going in a direction to decrease the diameter of the annulus to be formed by the mass member. In this case, when the number of rotations of the rotation shaft is a given number of rotations or less, due to the energizing force of the energizing member, the annular mass member is contacted with the first rotation member in such a manner that it is pressed against the outer periphery of the latter. This can strengthen the connection between the first and second rotation members, thereby being able to realize the prevention of their relative rotation (permission of their integral rotation) more positively. Thus, the durability of the elastic member can be enhanced still further.

The mass member is formed in an annulus-like shape extending along the outer periphery of the first rotation member and is also mounted on the outer periphery of the first rotation member such that it can be rotated integrally with the first rotation member and can be shifted in the axial direction of the rotation shaft. And, the energizing member may apply to the mass member an energizing force going along the axial direction of the rotation shaft. In this case, when the number of rotations of the rotation shaft is a given number of rotations or less, due to the energizing force of the energizing member, the annular mass member is energized in the axial direction and is thereby contacted annularly with the second rotation member. Also, when the number of rotations of the rotation shaft exceeds a given number of rotations, a composite force constituted of a centrifugal force and an energizing force is applied to the mass member to thereby separate it from the second rotation member. Thus, using the centrifugal force and energizing force, the switching of prevention and permission of the relative rotation can be realized with a relatively simple structure.

The elastic member may be a coil spring or a spiral spring. In this case, the durability of the elastic member can be enhanced still further.

The elastic member may be made of rubber. In this case, the elastic member can be produced comparatively simply and inexpensively.

The elastic member may include a magnet. In this case, use of the repulsion of the magnet can prevent sound production which could otherwise be caused by the shifting movements of the composing members.

The given number of rotations may be 600 rpm.

According to a second aspect of the invention, there is provided a power transmission mechanism which comprises: a first rotation member mounted integrally rotatably on the rotation shaft of a drive apparatus; a second rotation member rotatable integrally with or relative to the first rotation member; an elastic member which is interposed between the first and second rotation members and, when the first and second rotation members are rotated relative to each other, absorbs a rotation difference between them; and, a switching portion which, when the number of rotations of the rotation shaft is a given number of rotations or less, comes into contact with the first and second rotation members to connect them together, thereby preventing the relative rotation between the first and second rotation members and, when the number of rotations of the rotation shaft exceeds a given number of rotations, is separated from at least one of the first and second rotation members due to a centrifugal force generated from the rotation of the rotation shaft to remove the above connection, thereby permitting the relative rotation of the first and second rotation members in both forward and backward directions through the elastic member.

In the second aspect as well, similarly to the first aspect, when the number of rotations of the rotation shaft is a given number of rotations or less, the switching portion prevents the relative rotation between the first and second rotation members (that is, permits their integral rotation). Therefore, a large stress will not be applied to the elastic member and thus the fatigue of the elastic member can be reduced.

MODE FOR CARRYING OUT THE INVENTION

Now, description will be given below of preferred embodiments of the invention with reference to the accompanying drawings.

Firstly, description will be given below of the whole structure of a car engine auxiliary machine drive system 100 including a power transmission mechanism 1 according to the first embodiment of the invention with reference to FIG. 1.

Figure 1:
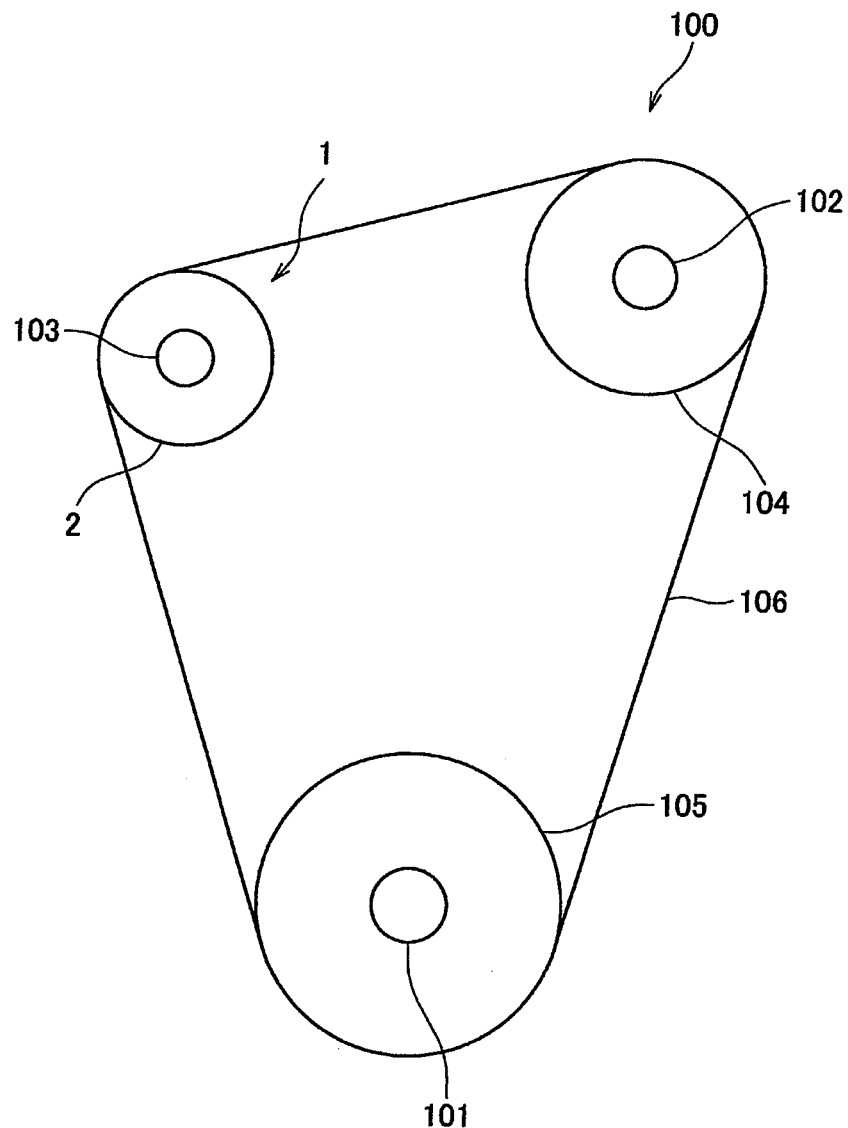
FIG. 1 is a schematic structure view of an auxiliary machine drive system including a power transmission mechanism according to a first embodiment of the invention.

As shown in FIG. 1, the auxiliary machine drive system 100 includes the output shaft 101 of an engine (such as the crankshaft of a reciprocating engine and the eccentric shaft of a rotary engine), a drive pulley 105 connected to the output shaft 101, driven shafts 102, 103 respectively connected to various auxiliary machines (such as a water pump and an alternator), a driven pulley 104 mounted on the driven shaft 102, a driven pulley 2 mounted on the driven shaft 103 and included in the power transmission mechanism 1 of the present embodiment, and a drive belt 106 extended over the pulleys 2, 104 and 105. In this embodiment, as the drive belt 106, there is used a V-ribbed belt including multiple V ribs 106a extending parallel to each other along the belt longitudinal direction (see FIG. 2).

As the drive pulley 105 is rotated due to the torque of the output shaft 101, the drive belt 106 is caused to run. With the run of the drive belt 106, the driven pulleys 2 and 104 are respectively rotated to thereby drive various auxiliary machines connected to the driven shafts 102 and 103. Thus, the power transmission mechanism 1 of this embodiment has a function to transmit to the driven shaft 103 torque transmitted from the output shaft 101 through the drive belt 106.

Figure 2:
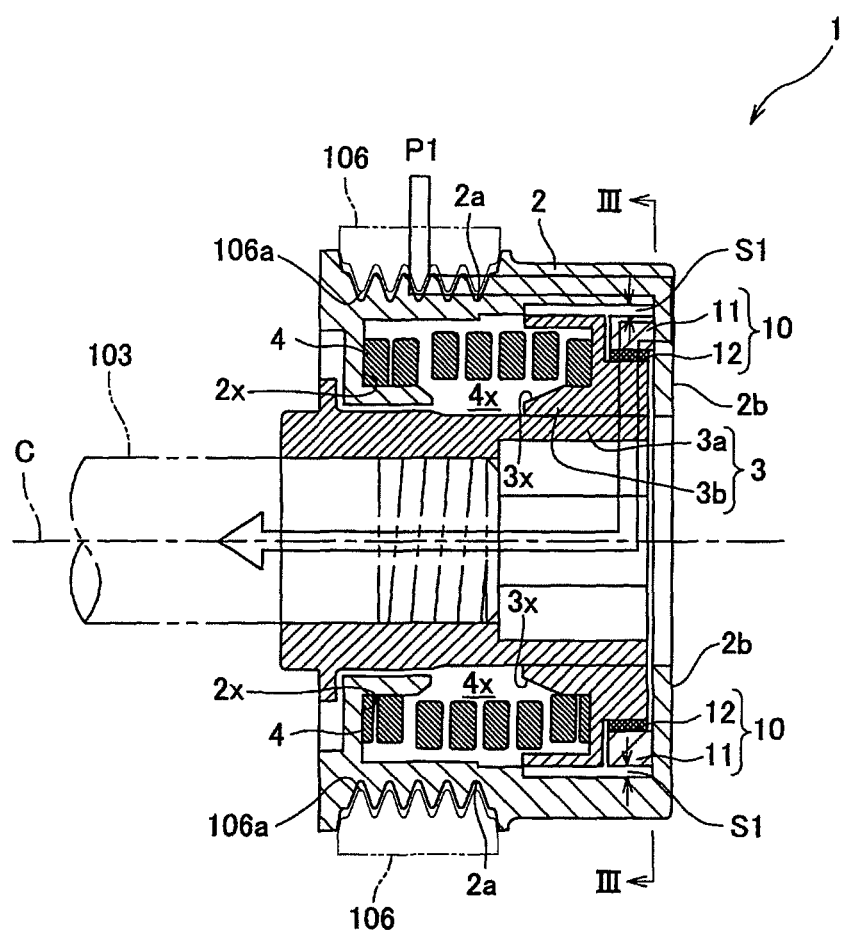
FIG. 2 is a section view of the power transmission mechanism shown in FIG. 1 in its locked state.
Figure 3:
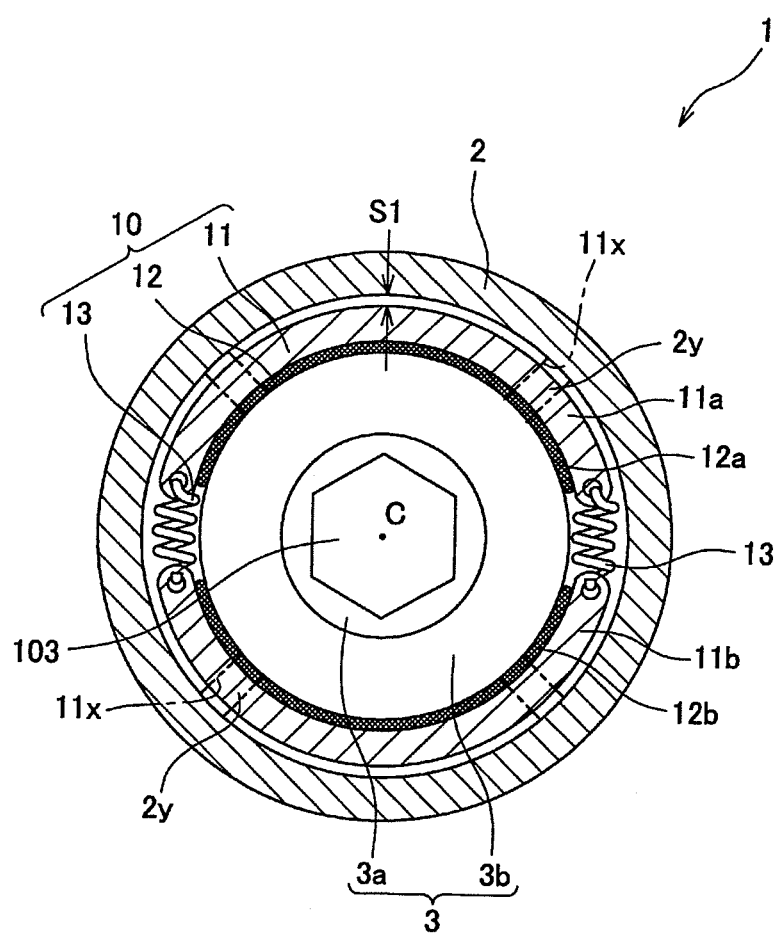
FIG. 3 is a section view taken along the line shown in FIG. 2.
Figure 4:
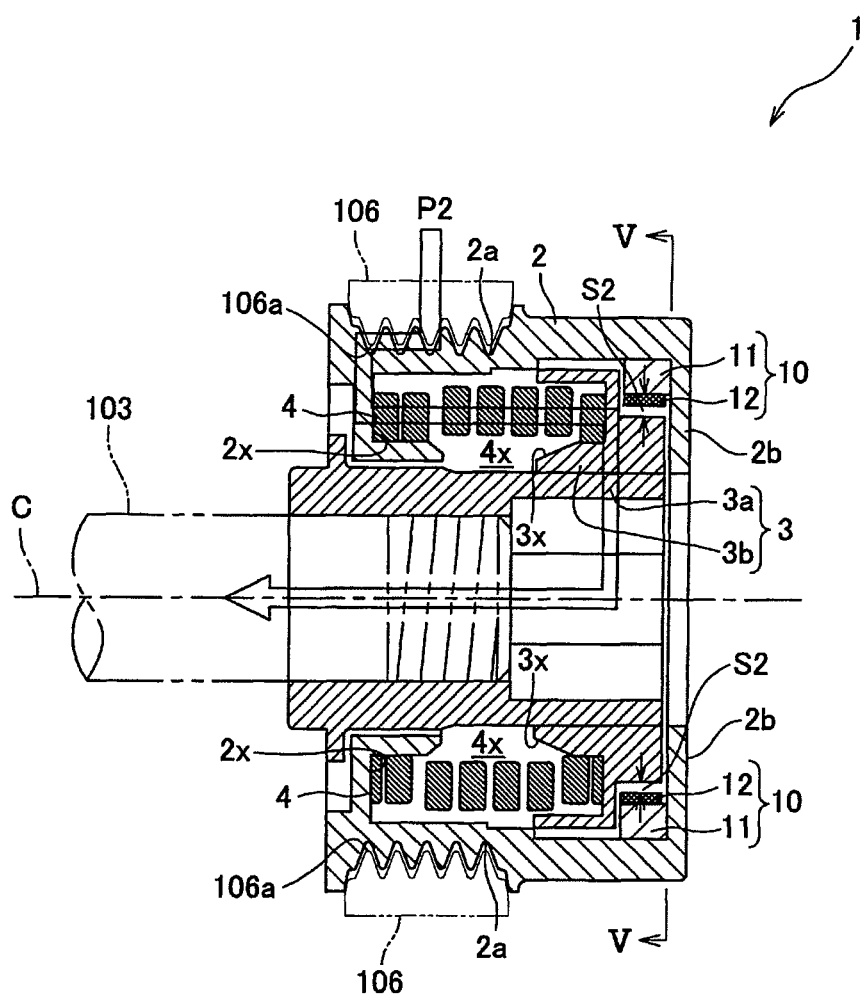
FIG. 4 is a section view of the power transmission mechanism shown in FIG. 1 in its unlocked state.

Next, description will be given below of the power transmission mechanism 1 of this embodiment with reference to FIGS. 2 to 5. FIGS. 2 to 4 are respectively section views of the power transmission mechanism 1, taken along its surface including the rotation center axis C of the driven shaft 103. In the following description, the right side of FIGS. 2 to 4 is called the leading end side, while the left side is called the base end side.

As shown in FIGS. 2 to 5, the power transmission mechanism 1 includes a pulley 2 having a cylindrical shape with an axis C as its center, a hub 3, similarly to the pulley 2, having a cylindrical shape with an axis C as its center but one size smaller than the pulley 2 and disposed inside the pulley 2, a coil spring 4 interposed between the pulley 2 and hub 3, and a switching portion 10 for selectively switching the pulley 2 and hub 3 between their locked state where their relative rotation is prevented (that is, their integral rotation is permitted) and their unlocked state where their relative rotation is permitted (that is, their integral rotation is prevented). Now, description will be given below of the structures of these respective composing parts.

In the outer peripheral surface of the pulley 2, as shown in FIG. 2, there are formed multiple V grooves 2a respectively extending along the peripheral direction of the pulley 2. The drive belt 106 is wound around the outer periphery of the pulley 2 with their ribs 106a inserted into the V grooves 2a of the pulley 2 respectively. The pulley 2 includes on its leading end a cover 2b extending from the peripheral surface toward the axis C in a direction perpendicular to the axis C. The switching portion 10 is disposed on the back side of the cover 2b.

The hub 3 includes an inner cylinder 3a extending along the axis C and an outer cylinder 3b fixed to such portion of the outer peripheral surface of the hub 3 as exists in the vicinity of the leading end of the inner cylinder 3a. The vicinity of the leading end of the driven shaft 103 is inserted through the inner cylinder 3a and, using a proper fixing member such as a bolt, the hub 3 and driven shaft 103 are connected to each other in a relative rotation prevented manner. That is, the hub 3 is mounted on the driven shaft 103 in such a manner that it can be rotated integrally with the same.

The coil spring 4 is produced by spirally winding a metal wire or the like and is stored within a storage chamber 4x formed between the pulley 2 and hub 3. The storage chamber 4x is a space existing between a groove 2x formed by an L-shaped section projection projecting from the inner peripheral surface of the pulley 2 toward the axis C and a groove 3x formed on the base end side of the outer cylinder 3b. The grooves 2x and 3x are respectively formed to have an annular shape extending along the inner peripheral surface of the pulley 2 and the base end side surface of the outer cylinder 3b. That is, the storage chamber 4x is an annular space having the axis C as its center, while the coil spring 4 is disposed spirally such that it is situated within the annular storage chamber 4x. The two ends of the coil spring 4 are respectively connected to wall surfaces respectively fitted into or defining the grooves 2x and 3x, whereby they are fixed to the pulley 2 and hub 3. The coil spring 4 connects together the pulley 2 and hub 3 in this manner and, when the pulley 2 and hub 3 are rotated relative to each other in the unlocked state, it absorbs the rotation difference between them due to its elasticity.

Here, the pulley 2 and hub 3 can be connected together indirectly by the 4 switching portion 10 in the locked state and by the coil spring 4 in the unlocked state, but any portions of them will never be contacted directly.

The switching portion 10, as shown in FIGS. 2 and 3, includes a mass member 11, a friction member 12 and springs 13.

The mass member 11, as shown in FIG. 3, includes two arc-shaped members 11a and 11b connected together by the two springs 13 and formed annularly along the outer periphery of the outer cylinder 3b of the hub 3. The respective members 11a and 11b are mounted on the back surface of the cover 2b of the pulley 2 such that the mass member 11 can be rotated integrally with the pulley 2 and the diameter of an annulus to be formed by the mass member 11 can be increased or reduced. Specifically, on the back surface of the cover 2b of the pulley 2, there are formed multiple projecting portions 2y (see FIG. 3) respectively extending along the diameter direction of a circle with the axis C as its center and spaced from each other along the circumference of the circle; and, on such surfaces of the two members 11a and 11b of the mass member 11 as are contacted with the back surface of the cover 2b, there are formed multiple grooves 11x respectively corresponding to the projecting portions 2y and extending along the above diameter direction. The mass member 11 can be rotated integrally with the pulley 2 due to the engagement between the grooves 11x and projecting portions 2y and, due to the sliding movements of the projecting portions 2y within the grooves 11x, the diameter of an annulus to be formed within a surface perpendicular to the axis C by the mass member 11 can be increased or reduced.

The friction member 12 includes two sheet-shaped members 12a and 12b respectively placed on and attached to the inner peripheral surfaces of the members 11a and 11b of the mass member 11. The members 12a and 12b of the friction member 12 are respectively made of rubber or resin and their surfaces have larger friction coefficients than the members 11a and 11b of the mass member 11. The inner peripheral surfaces of the members 12a and 12b of the friction member 12 are respectively contacted with the outer peripheral surface of the outer cylinder 3b of the hub 3 in the locked state shown in FIGS. 2 and 3.

The spring 13 is produced by spirally winding a metal wire or the like similarly to the coil spring 4. Two springs 13 are provided at opposite positions across the axis C such that they can connect together the members 11a and 11b of the mass member 11. The springs 13 respectively connect together the vertically opposing end portions of the members 11a and 11b, and apply to the mass member 11 an energizing force going in a direction where these end portions approach each other. That is, the springs 13 apply to the mass member 11 an energizing force in a direction where an annulus to be formed by the mass member 11 is reduced in diameter (a direction going toward the axis C for contact with the hub 3).

Here, description will be given of the operations of the respective parts of the power transmission mechanism 1 to be carried out when the auxiliary machine drive system 100 (see FIG. 1) is driven.

Firstly, when the drive belt 106 is caused to run due to the torque of the output shaft 101 shown in FIG. 1, the pulley 2 is rotated. The power generated by the rotation of the pulley 2 is transmitted to the hub 3 and driven shaft 103, while the transmission route of the power can be varied by the switching portion 10 switching the power transmission mechanism 1 between the locked and unlocked states according to the number of rotations of the driven shaft 103.

When the number of rotations of the driven shaft 103 is a given number of rotations (for example, 600 rpm (revolutions per minute)) or less, (for example, just after start of rotation of the pulley 2), the power transmission mechanism 1, as shown in FIGS. 2 and 3, is maintained by the switching portion 10 in its locked state where the pulley 2 and hub 3 cannot be rotated relative to each other. In this case, the mass member 11 of the switching portion 10 is contacted through the friction member 12 with the hub 3 due to the energizing force of the spring 13. The inner peripheral surface of the friction member 12 is contacted with the outer peripheral surface of the outer cylinder 3b of the hub 3 and, due to a frictional force generated between the contacted surfaces thereof, the pulley 2 and hub 3 are connected (locked) to each other in such a manner that they can be rotated integrally in both of the forward and backward directions of their rotation directions. In the locked state, as shown by an arrow P1 in FIG. 2, power is transmitted from the drive belt 106 through the pulley 2 and the mass member 11 and friction member 12 of the switching portion 10 to the hub 3 and driven shaft 103. In this case, the respective composing parts 2, 11, 12, 103 can be rotated integrally about the axis C.

Figure 5:
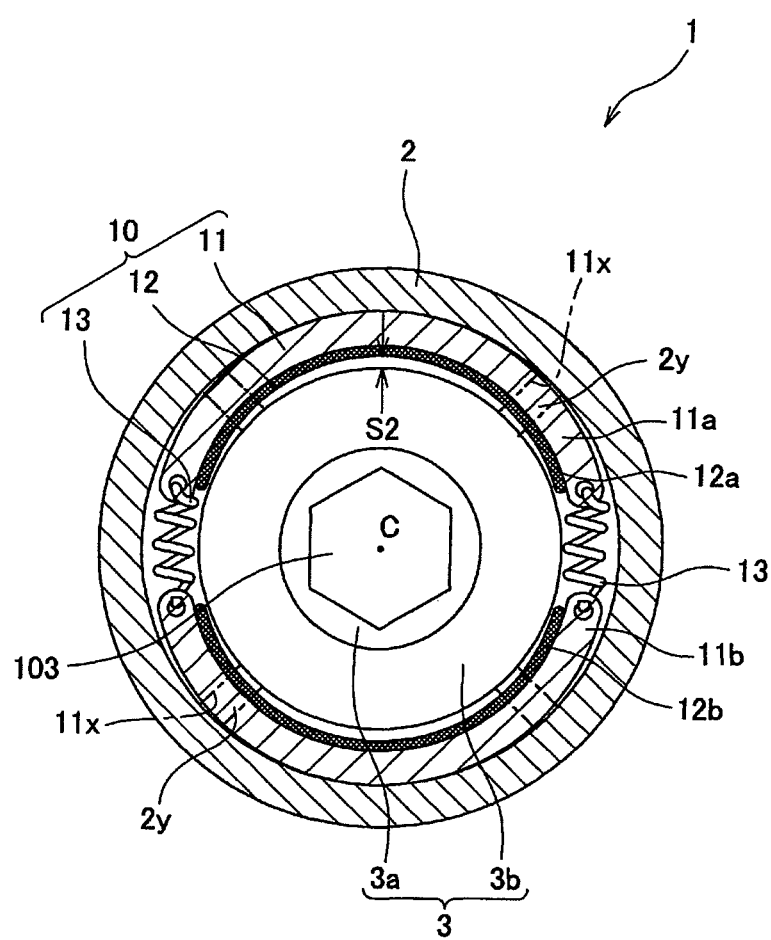
FIG. 5 is a section view taken along the V-V line shown in FIG. 4.

In the case that the number of revolutions of the driven shaft 103 exceeds a given number of revolutions (for example, after a given time has elapsed just after the time of start of rotation of the pulley 2), the power transmission mechanism 1, as shown in FIGS. 4 and 5, is maintained in its unlocked state where the pulley 2 and hub 3 can be rotated relative to each other. In this state, the mass member 11 and friction member 12 of the switching portion 10 are separated from the hub 3. The reason for this is that, when the number of revolutions of the driven shaft 103 exceeds a given number of revolutions, due to a centrifugal force generated by the revolution of the driven shaft 103, the mass member 11, while sliding with the grooves 11x engaged with the projecting portions 2y, is caused to shift together with the friction member 12 toward outside the axis C against the energizing force of the spring 13. Thus, in the locked state shown in FIGS. 2 and 3, a clearance S1 formed between the outer peripheral surface of the mass member 11 and the inner peripheral surface of the pulley 2 substantially disappears and, instead, a clearance S2 is formed between the inner peripheral surface of the friction member 12 and the outer peripheral surface of the outer cylinder 3b of the hub 3. As the mass member 11 and friction member 12 are separated from the hub 3 in this manner, the connection between the pulley 2 and hub 3 is removed (unlocked), whereby the pulley 2 and hub 3 are allowed to rotate relative to each other in both the forward and backward directions of their rotation directions. In the unlocked state, as shown by an arrow P2 shown in FIG. 4, power is transmitted from the drive belt 106 through the pulley 2 and coil spring 4 to the hub 3 and driven shaft 103. A rotation difference generated between the pulley 2 and hub 3 at the then time can be absorbed by the coil spring 4, thereby being able to prevent vibrations or the like which could otherwise be caused due to the rotation difference.

As described above, in the power transmission mechanism 1 of this embodiment, when the number of revolutions of the driven shaft 103 is a given number of revolutions or less (for example, at the time of start of rotation of the rotation shaft), the pulley 2 and hub 3 are prevented against rotation relative to each other by the switching portion 10 (that is, they can be rotated integrally), thereby being able to prevent the generation of the rotation difference between them. This can prevent a large stress from acting onto the coil spring 4 and thus can reduce the fatigue of the coil spring 4.

The switching portion 10 includes the friction member 12. When the number of revolutions of the driven shaft 103 is a given number of revolutions or less, the mass member 11 is contacted through the friction member 12 with the hub 3 and, when the number of revolutions of the driven shaft 103 exceeds a given number of revolutions, the friction member 12, together with the mass member 11, is caused to shift and is thereby separated from the hub 3. Therefore, due to the existence of the friction member 12, the connection between the pulley 2 and hub 3 when the number of revolutions of the driven shaft 103 is a given number of revolutions or less is strengthened, thereby being able to more positively prevent their relative rotation (to allow their integral rotation) and thus to further enhance the durability of the coil spring 4.

The friction member 12 is made of one of rubber and resin. Therefore, using the friction member 12 which is relatively inexpensive and has a simple structure, the above effects (the relative rotation preventive effect and the resultant coil spring 4 durability enhancing effect) can be provided.

Such portion of the mass member 11 as can be contacted with the hub 3 when the number of revolutions of the driven shaft 103 is a given number of rotations or less is formed to have an annular shape (see FIG. 3). That is, since the contact area between the mass member 11 and hub 3 is formed in an annulus, the connection between the pulley 2 and hub 3 when the number of revolutions of the driven shaft 103 is a given number of rotations or less is strengthened, thereby being able to more positively prevent their relative rotation (to allow their integral rotation). This also can enhance the durability of the coil spring 4 further.

The mass member 11 is connected to the hub 3 by the spring 13 and also extends annularly along the outer periphery of the hub 3. And, the mass member 11 is mounted on the pulley 2 in such a manner that it can be rotated integrally with the pulley 2 and the diameter of an annulus to be formed by the mass member 11 can be increased or reduced. The spring 13 applies to the mass member 11 an energizing force going in a direction to reduce the diameter of the annulus to be formed by the mass member 11. Therefore, when the number of revolutions of the driven shaft 103 is a given number of rotations or less, due to the energizing force of the spring 13, the annular mass member 11 is contacted with the hub 3 while it is pressed against the outer periphery of the hub 3. This strengthens the connection between the first and second rotation members, thereby being able to further positively realize their relative rotation prevention (their integral rotation permission). Also, the durability of the coil spring 4 can be enhanced further.

Since the coil spring 4 is used as an elastic member, the durability of the elastic member can be enhanced further.

Figure 6:
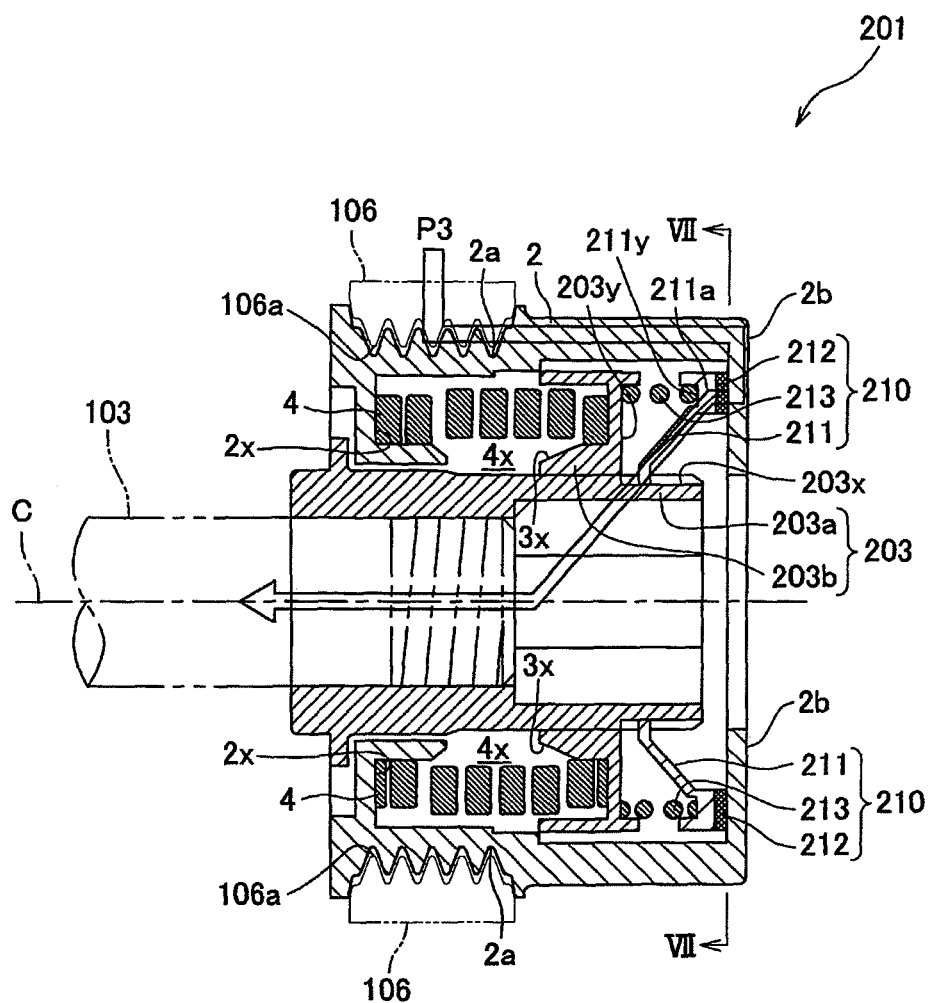
FIG. 6 is a section view, corresponding to FIG. 2, of an auxiliary machine drive system including a power transmission mechanism according to a second embodiment of the invention, showing its locked state.

Next, description will be given below of a power transmission mechanism 201 according to a second embodiment of the invention with reference to FIGS. 6 to 9. FIGS. 6 and 8 are respectively a section view of the power transmission mechanism 201 taken along the surface thereof including the rotation center axis C thereof. In the following description, the right side in FIGS. 6 to 8 is regarded as the leading end side, while the left side is regarded as the base end side.

The power transmission mechanism 201 is different from the first embodiment only in the structures of a hub 203 and a switching portion 210. Therefore, the same composing elements as the first embodiment are given the same reference numerals and thus the description thereof is omitted.

A hub 203 according to this embodiment includes an inner cylinder 203a extending along the axis C and an outer cylinder 203b fixed to the outer peripheral surface of the vicinity of the leading end portion of the inner cylinder 203a. Into the inner cylinder 203a, similarly to the inner cylinder 3a of the first embodiment, there is inserted the vicinity of the leading end portion of the driven shaft 103 and, by a proper fixing member such as a bolt, the hub 203 and driven shaft 103 are connected together in a relative rotation prevented manner.

Figure 7:
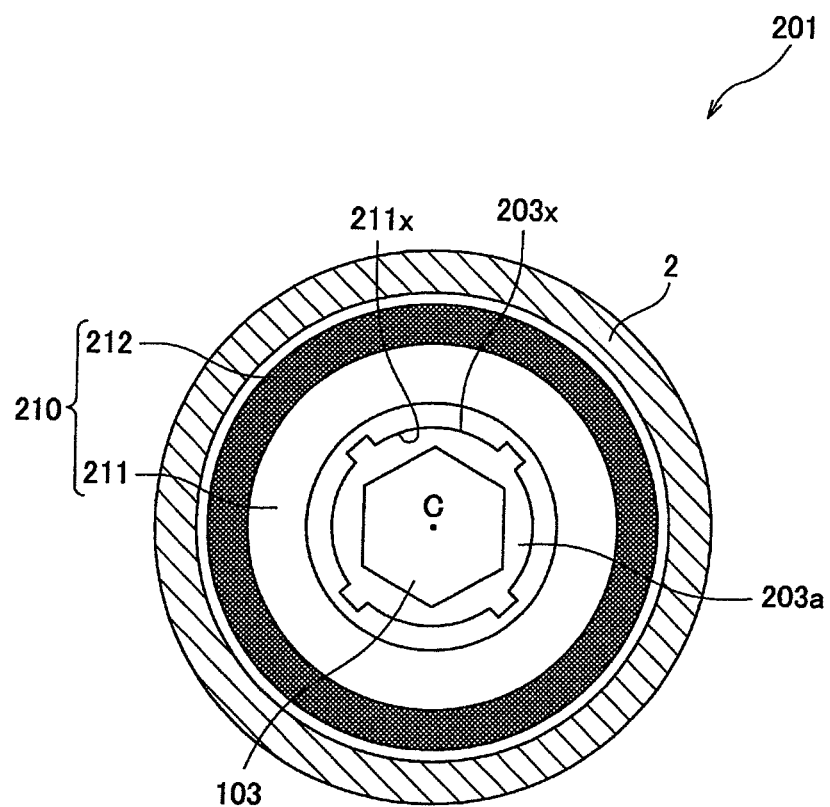
FIG. 7 is a section view taken along the VII-VII line shown in FIG. 6.
Figure 8:
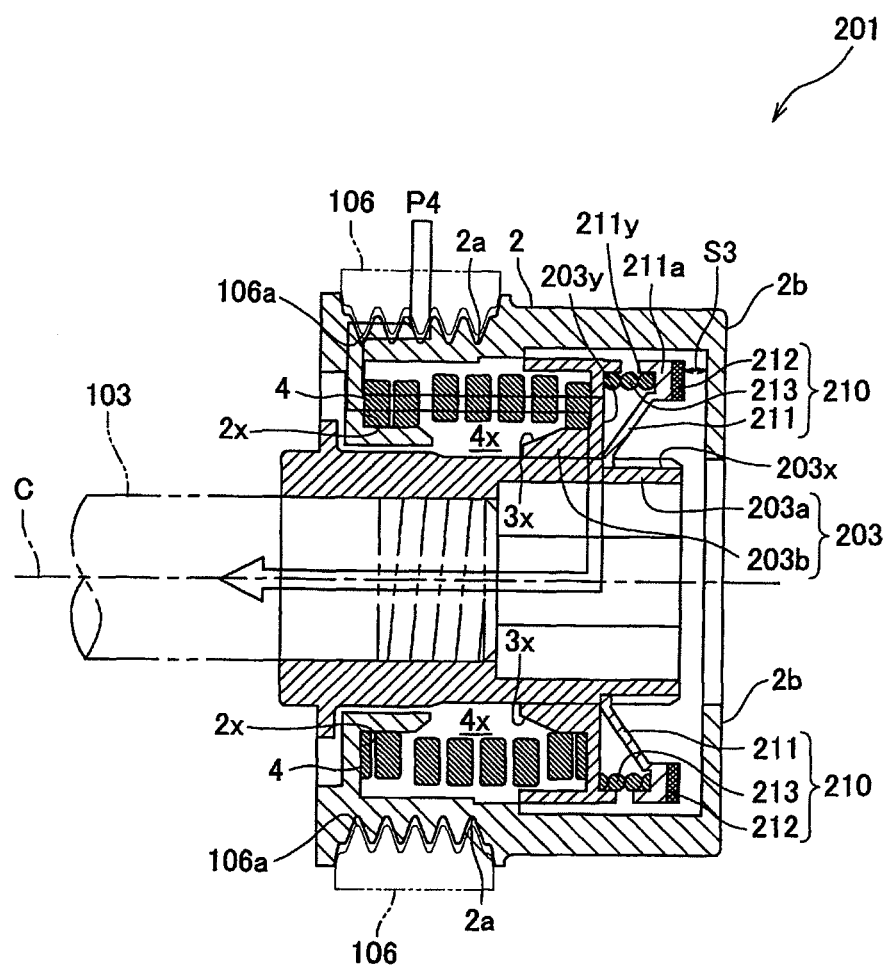
FIG. 8 is a section view of the power transmission mechanism shown in FIG. 6 in its unlocked state.

In the outer peripheral surface of the vicinity of the leading end portion of the inner cylinder 203a, there are formed four recess portions 203x which, as shown in FIG. 6, respectively have a given width along the axis C direction from the leading end thereof and, as shown in FIG. 7, extend along the outer peripheral surface of the inner cylinder 203a and are spaced from each other.

The outer cylinder 203b is smaller in the axis C direction length by an amount equivalent to the disposition area of the switching portion 210 than the outer cylinder 3b of the first embodiment, and is situated at a position spaced by a given distance (a distance equivalent to the above disposition area) from the leading end of the inner cylinder 203a. The outer cylinder 203b includes, besides its base end side grooves 3x similar to the first embodiment, annular-shaped grooves 203y formed on its leading end side.

The switching portion 210 of this embodiment includes a mass member 211, a friction member 212 and a spring 213.

The mass member 211, as shown in FIG. 7, has an annular shape extending along the outer periphery of the vicinity of the leading end of the inner cylinder 203a of the hub 203, and is mounted on the outer peripheral surface of the inner cylinder 203a. Specifically, four projecting portions 211x formed on the inside end face of the mass member 211 are respectively fitted into the recess portions 203x of the inner cylinder 203a, whereby the mass member 211 can be rotated integrally with the inner cylinder 203a and can be moved (slid) in the axis C direction.

The mass member 211, as shown in FIG. 6, is inclined from its base end side toward its leading end side, namely, from its inside toward its outside. The outside end portion of the mass member 211 includes a section 211a extending along a direction perpendicular to the axis C and, similarly to the first embodiment, a sheet-shaped friction member 212 is placed on and adhered to the surface of the leading end side of this section 211a. The section 211a has an annular shape with a given width, while the friction member 212 also has an annular shape with a given width.

The friction member 212 is made of rubber or resin and its surface has a larger friction coefficient than the mass member 211. The surface of the friction member 212 (the surface opposite to the surface adhered to the section 211a), in its locked state shown in FIGS. 6 and 7, is contacted with the back surface of the cover 2b of the pulley 2.

The section 211a of the outside end portion of the mass member 211 includes an annular recess portion 211y on its base end side, while the spring 213 is disposed in an annular space formed between the recess section 211y and the groove 203y of the outer cylinder 203b of the hub 203.

The spring 213 is produced by spirally winding a metal wire or the like. One and the other ends of spring 213 are respectively fitted into the groove 203y of the hub 203 and the recess section 211y of the mass member 211, or are connected to wall surfaces defining the groove 203y and recess section 211y, whereby the spring 213 is fixed to the hub 203 and mass member 211. The spring 213 applies to the mass member 211 an energizing force going along the axis C direction.

Now, description will be given below of the operations of the composing parts of the power transmission mechanism 201 when it is driven.

Similarly to the first embodiment, power generated due to the rotation of the pulley 2 is transmitted to the hub 203 and driven shaft 103, while the transmission route of the power is varied by the switching portion 210 switching the power transmission mechanism 201 between the locked and unlocked states according to the number of rotations of the driven shaft 103.

When the number of revolutions of the driven shaft 103 is a given number of revolutions or less (for example, just after the time of start of rotation of the pulley 2), the power transmission mechanism 201, as shown in FIGS. 6 and 7, is maintained by the switching portion 210 in the locked state where the pulley 2 and hub 203 are prevented against relative rotation. In this case, the mass member 211 of the switching portion 210 is contacted through the friction member 212 with the pulley 2 due to the energizing force of the spring 213. The surface of the friction member 212 and the back surface of the cover 2b of the pulley 2 are contacted with each other and, due to a frictional force generated between the contacted surfaces, the pulley 2 and hub 203 are connected (locked) in an integral rotation allowable state. Also, in this case, the inside end portion vicinity of the base end side of the mass member 211 is not contacted with the wall defining the groove 203y of the hub 203 but is spaced from this wall. In the locked state, as shown by an arrow P3 in FIG. 6, the power is transmitted from the drive belt 106 through the pulley 2, the friction member 212 and mass member 211 of the switching portion 210 to the hub 203 and driven shaft 103. In this case, the respective parts 2, 211, 212, 203 and 103 are rotated integrally about the axis C.

When the number of rotations of the driven shaft 103 exceeds a given number of rotations (for example, after elapse of a given time just after the time of start of rotation of the pulley 2), the power transmission mechanism 201, as shown in FIG. 8, is maintained by the switching portion 210 in the unlocked state where the pulley 2 and hub 203 are can be rotated relative to each other. In this case, the mass member 211 and friction member 212 of the switching portion 210 are spaced from the pulley 2. The reason for this is that, when the number of rotations of the driven shaft 103 exceeds a given number of rotations, due to a centrifugal force generated by the rotation of the driven shaft 103, the mass member 211, together with the friction member 212, is moved (slid) toward the base end side along the axis C against the energizing force of the spring 213. Consequently, the inside end portion vicinity of the base end side of the mass member 211 is contacted with the wall defining the groove 203y of the hub 203 to thereby form a clearance S3 between the surface of the friction member 212 and the back surface of the cover 2b of the pulley 2. As the mass member 211 and friction member 212 are separated from the pulley 2 in this manner, the connection between the pulley 2 and hub 203 is removed (unlocked), whereby the pulley 2 and hub 203 can be rotated relative to each other. In the unlocked state, as shown by an arrow P4 in FIG. 8, the power is transmitted from the drive belt 106 through the pulley 2 and coil spring 4 to the hub 203 and driven shaft 103. A rotation difference generated between the pulley 2 and hub 203 in this case is absorbed by the coil spring 4, thereby being able to prevent vibrations which would otherwise be caused by the rotation difference.

Figure 9:
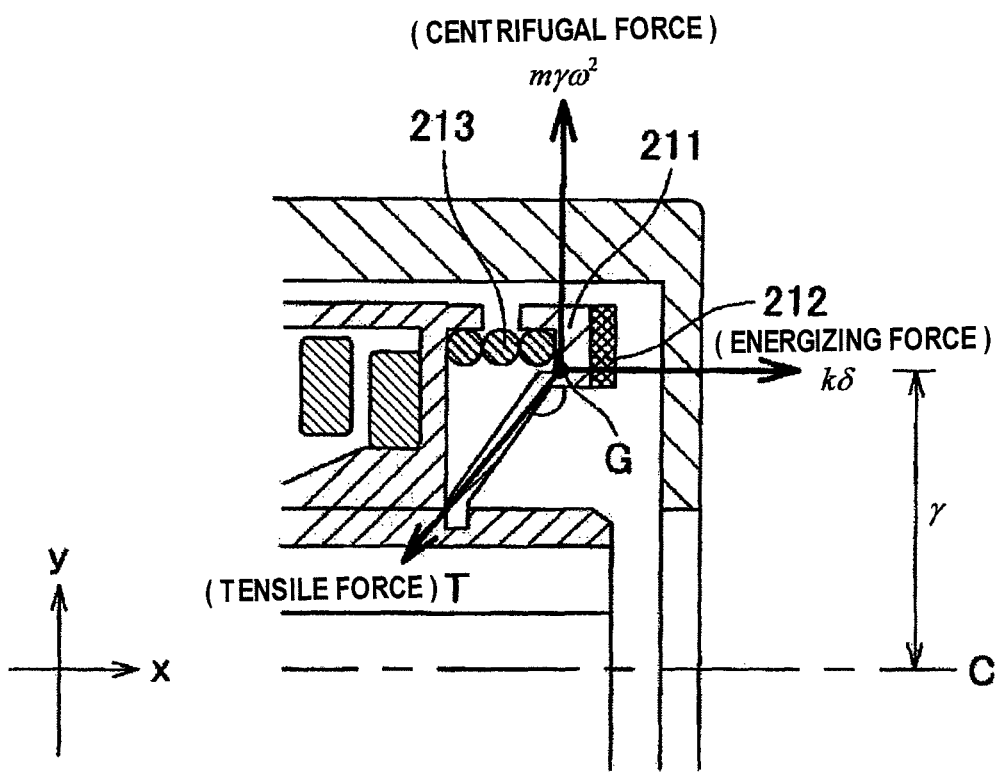
FIG. 9 is a partial view of FIG. 8, showing a force to be applied to the center of gravity of a mass member in the unlocked state.

Here, in the unlocked state, forces acting on the center of gravity G of the mass member 211 are as shown in FIG. 9. In FIG. 9, m expresses the mass of the mass member 211, r the distance from the axis C to the center of gravity G along the y axis direction, ω an angular velocity, k the spring constant of the spring 213, δ the compression amount of the spring 213, T a tensile force generated within the mass member 211, and θ the inclination angle of the mass member 211 with respect to the y, respectively. That is, on the center of gravity G of the mass member 211, there act the energizing force kδ of the spring 213 in the x axis direction, and a centrifugal force mrω² in the y axis direction, whereas as a reaction against these forces, a tensile force T is generated in the mass member 211. The x-direction component (Tx) and y-direction component (Ty) of the tensile force T are expressed by the following expressions (1) and (2), respectively.

[Numeric Expression 1]

$$T_x = T \sin \theta = k\delta \qquad (1)$$

[Numeric Expression 2]

$$T_y = T \cos \theta = m\gamma\omega^2 \qquad (2)$$

As has been described above, the power transmission mechanism 201 of this embodiment can provide similar effects to the first embodiment with the similar structure thereto and also can provide the following effects. That is, in this embodiment, the mass member 211 is formed along the outer periphery of the hub 203 into an annulus and is mounted on the outer periphery of the hub 203 such that it can be rotated integrally with the hub 203 and also it can be shifted in the axis C direction, while the spring 213 applies to the mass member 211 an energizing force going along the axis C direction. Therefore, when the number of rotations of the driven shaft 103 is a given number of rotations or less, due to the energizing force of the spring 213, the mass member 211 is energized in the axis C direction and is annularly contacted with the pulley 2. On the other hand, when the number of revolutions of the driven shaft 103 exceeds a given number of rotations, a composite force constituted of the centrifugal force and energizing force acts on the mass member 211 to thereby separate the mass member 211 from the pulley 2. Thus, according to this embodiment, using the centrifugal force and energizing force, the switching of the permission and prevention of the relative rotation of the pulley and hub can be realized with a relatively simple structure.

Although description has been given heretofore of the preferred embodiments of the invention, the invention is not limited to the above embodiments but various design changes are also possible without departing from the scope of the appended claims.

The power transmission mechanism of the invention is not limited to the above embodiments where the first rotation member is mounted on the driven shaft 103 connected to the auxiliary machine applied to the auxiliary machine drive system of a car engine but, for example, the first rotation member may also be mounted on the output shaft 101 of the engine.

The application of the power transmission mechanism of the invention is not limited to the auxiliary machine drive system of a car engine as in the above embodiments, but it can also be applied to other proper power transmission system, for example, a system which varies torque according to the opening/closing angle of an opening/closing member such as a window, a door and a cover.

In the above embodiments, the drive belt 106 is wound around the pulley 2 serving as the second rotation member. However, this is not limitative but, for example, a chain may also be wound around the second rotation member or a gear may be engaged with the second rotation member.

As an energizing member included in the switching portion, besides the spring as in the above embodiments, there may also be applied various members provided that they can apply an energizing force. For example, there may also be applied a solid member (rubber or the like) made of elastic material, or a magnet.

The material of the friction member is not limited to any one of rubber and resin, but it may also be made of any one of other various materials.

The friction member is not a composing element essential to the power transmission mechanism of the invention but it can also be omitted.

The shape of the mass member is not limited to an annulus but can be changed variously. For example, the mass member may also be contacted with only a portion such as the upper end or lower end of the first or second rotation member.

The elastic member is not limited to the coil spring 4 but, for example, it may also be a spiral spring. Also, the composing material of the elastic member is not limited to the metal wire but it may also be any one of various materials, for example, it may also be made of rubber or a magnet. When the elastic member is made of rubber, it can be made relatively easily and inexpensively. Also, when the elastic member includes a magnet, since the repulsion of the magnet is used, it is possible to avoid sound production which can be caused by the shifting movement of the elastic member.

A given number of rotations is not limited to 600 rpm but it can be set properly.

Although the present patent application has been described heretofore specifically with reference to specific embodiments, it is obvious to persons skilled in the art that various changes and modifications are also possible without departing from the scope and spirit of the invention.

The present application is based on Japanese Patent Application (Japanese Patent Application No. 2009-146082) filed on Jun. 19, 2000 and thus the contents thereof are incorporated herein as reference.

DESCRIPTION OF REFERENCE NUMERALS

1; 201: Power transmission mechanism
2: Pulley (second rotation member)
3; 203: Hub (first rotation member)
4: Coil spring (elastic member)
10; 210: Switching portion
11; 211: Mass member
12; 212: Friction member
13; 213: Spring (energizing member)
103: Driven shaft (rotation shaft of drive apparatus)

The invention claimed is:

1. A power transmission mechanism comprising:
a first rotation member mounted integrally rotatably on the rotation shaft of a drive apparatus;
a second rotation member rotatable integrally with or relative to the first rotation member;
an elastic member interposed between the first and second rotation members for, when the first and second rotation members rotate relative to each other, absorbing a rotation difference between them; and
a switching portion, including a mass member mounted on one of the first and second rotation members and rotatable integrally therewith, and an energizing member for energizing the mass member in a direction where the mass member can be contacted with the other of the first and second rotation members, the switching portion being structured such that, when the number of rotations of the rotation shaft is a given number of revolutions or less, the mass member is contacted with the other rotation member due to the energizing force of the energizing member to generate a frictional force between their respective contacted surfaces, thereby preventing the relative rotation between the first and second rotation members, and when the number of rotations of the rotation shaft exceeds a given number of rotations, due to a centrifugal force generated from the rotation of the rotation shaft, the mass member is shifted against the energizing force of the energizing member and is separated from the other rotation member, thereby permitting the relative rotation between the first and second rotation members through the elastic member;
wherein an end of the elastic member is fixed to the first rotation member, and another end of the elastic member is fixed to the second rotation member.

2. The power transmission mechanism according to claim 1, wherein:
the switching portion includes a friction member disposed on the surface of the mass member and having a first surface contactable with the other rotation member, the first surface having a larger coefficient of friction than the surface of the mass member; and
when the number of rotations of the rotation shaft is a given number of rotations or less, the friction member is contacted with the other rotation member and, when the number of rotations of the rotation shaft exceeds a given number of rotations, the friction member is shifted together with the mass member and is thereby separated from the other rotation member.

3. The power transmission mechanism according to claim 2, wherein
the friction member is made of rubber or resin.

4. The power transmission mechanism according to claim 2, wherein
the first surface includes a curved surface corresponding to the surface of the other rotation member.

5. The power transmission mechanism according to claim 4, wherein:
the mass member is connected by the energizing member so as to have an annulus-like shape along the outer periphery of the first rotation member, and also the mass member is mounted on the second rotation member such that it can be rotated integrally with the second rotation member and the annulus to be formed by the mass member can be increased or decreased in diameter; and
the energizing member applies to the mass member an energizing force going in a direction to decrease the diameter of the annulus to be formed by the mass member.

6. The power transmission mechanism according to claim 4, wherein
the mass member is formed in an annular shape extending along the outer periphery of the first rotation member and also is mounted on the outer periphery of the first rotation member such that it can be rotated integrally with the first rotation member and can be shifted in the axial direction of the rotation shaft; and
the energizing member applies to the mass member an energizing force going along the axial direction of the rotation shaft.

7. The power transmission mechanism according to claim 1, wherein
the elastic member is a coil spring or a spiral spring.

8. The power transmission mechanism according to claim 1, wherein
the elastic member is made of rubber.

9. The power transmission mechanism according to in claim 1, wherein
the elastic member includes a magnet.

10. The power transmission mechanism according to claim 1, wherein the given number of rotations is 600 rpm.

11. A power transmission mechanism comprising:
a first rotation member mounted integrally rotatably on the rotation shaft of a drive apparatus;
a second rotation member rotatable integrally with or relative to the first rotation member;
an elastic member interposed between the first and second rotation members for, when the first and second rotation members rotate relative to each other, absorbing a rotation difference between them; and
a switching portion, when the number of rotations of the rotation shaft is a given number of rotations or less, for coming into contact with the first and second rotation members to connect them together, thereby preventing the relative rotation between the first and second rotation members and, when the number of rotations of the rotation shaft exceeds a given number of rotations, for separating from at least one of the first and second rotation members due to a centrifugal force generated from the rotation of the rotation shaft to remove the above connection, thereby allowing the relative rotation of the first and second rotation members in both forward and backward directions through the elastic member,
wherein an end of the elastic member is fixed to the first rotation member, and another end of the elastic member is fixed to the second rotation member.

* * * * *